Patented Oct. 20, 1931

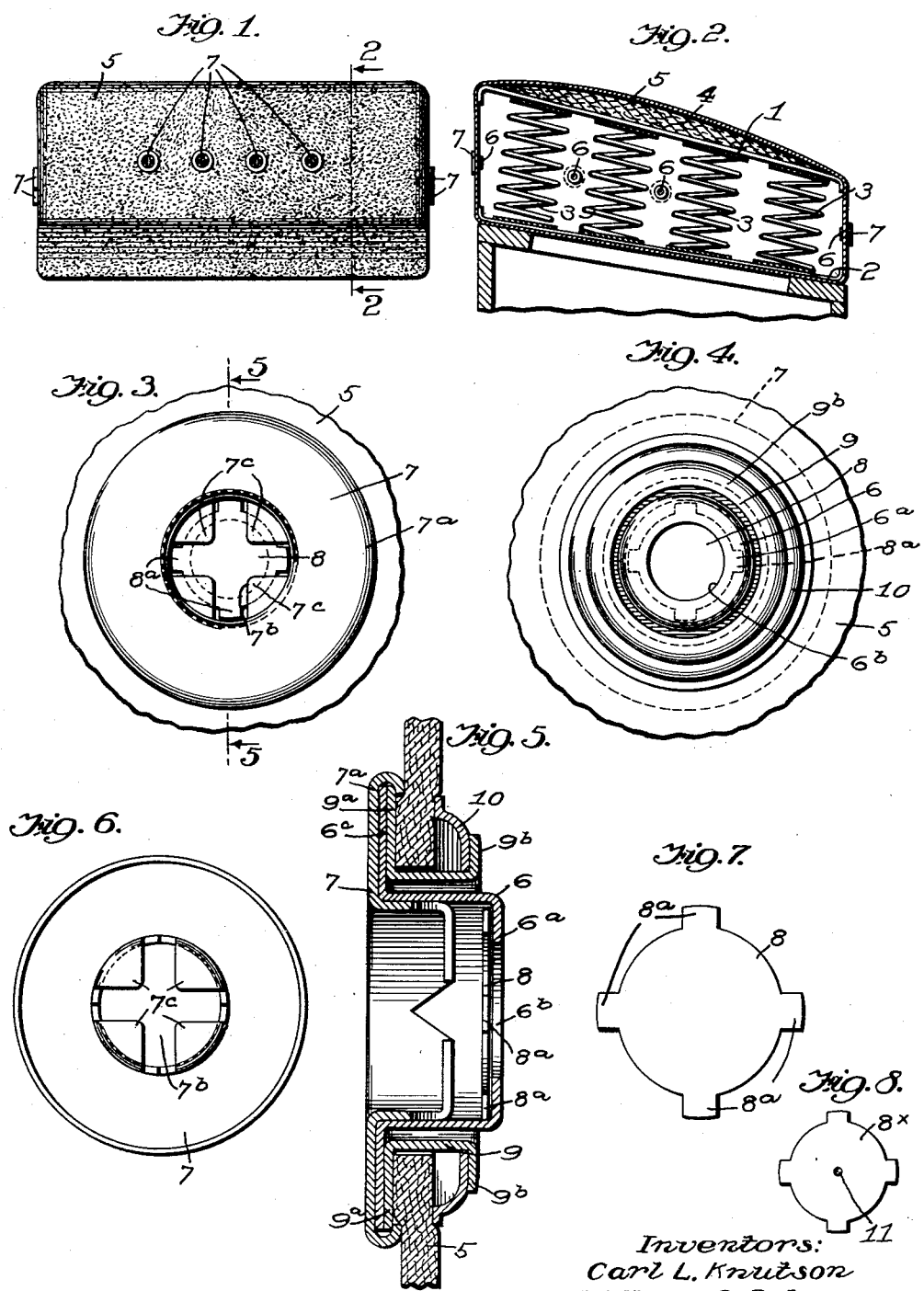

1,828,191

UNITED STATES PATENT OFFICE

CARL L. KNUTSON, OF MAYWOOD, WILLIAM G. ROBY, OF CHICAGO, AND ARTHUR W. KIMBELL, OF PARK RIDGE, ILLINOIS, ASSIGNORS TO CINCH MANUFACTURING CORPORATION, OF CHICAGO, ILLINOIS, A CORPORATION OF ILLINOIS

VALVE FOR CUSHION STRUCTURES

Original application filed December 13, 1926, Serial No. 154,457. Divided and this application filed October 24, 1928. Serial No. 314,820.

Our invention relates generally to cushion structures such, for example, as may be used for automobile seats, and has to do particularly with cushion check, shock absorbing and snubbing means for absorbing shocks, jolts, et cetera, transmitted to such cushion structure and for checking the rebound action of the cushion structure when subjected to impacts and shocks of sufficient force to cause depression of the same.

This application is a division of our prior application, Serial No. 154,457, filed December 13, 1926.

To facilitate description of our invention it will be described as applied to cushion structure for automobile seats; however, it is to be understood that it may be used in various related instances where ease and comfort of the user are desirable. It is a well-known fact that in the operation of automobiles over rough and uneven road surfaces, shocks and severe jolts are transmitted to and cause great discomfort to passengers of automobiles, and various devices have been devised in an attempt to eliminate discomfort due to such causes. However, such devices have heretofore been adapted particularly and practically exclusively to shock absorbing and snubbing devices cooperating with the ordinary automobile springs, and while transmission of these shocks has been somewhat overcome, yet not entirely so and not in such a manner as to provide for complete comfort. Also, cushion structure for automobiles has heretofore generally comprised a spring supporting structure and a covering therefor, the spring supporting means comprising mainly a plurality of coil springs compressible under certain shock, jolt and impact conditions. It is a well-known fact that these springs when compressed and then released tend to return to their normal supporting and load carrying position very quickly causing a fast, snappy rebound action which tends to throw the passengers. These ordinary cushion structures tend to multiply the shocks and jolts above referred to and still further add to the discomfort of passengers.

One of the objects of our invention is to eliminate the foregoing objections to cushion structures, such as may be used in connection with automobiles, and the like, this being accomplished in such a manner as to not only assist in absorbing shocks and jolts and other impacts but to also eliminate the above described rebound action of cushion spring structures thereby adding to and providing a maximum of comfort to users of such structures. In accomplishing this we provide cushion check and shock absorbing and snubbing means applied to enclosed cushion structures which may embody a plurality of springs as is now customary, or by other yieldable and depressible supporting means, —the arrangement being such that while the springs, or other yieldable supporting means, are compressible to assist in absorbing shocks and jolts transmitted to the cushion structure, yet the rebound action is checked and snubbed to prevent such action taking place quickly in such a manner as would tend to throw the person using such structure.

Another object is to provide air check means for cushion structures adapted to operate automatically to permit a quick and ready depression of the cushion structure but which is effective to prevent a rapid restoration of the same to its normal undepressed condition. To this end we provide an air control device which is adapted upon depression of the cushion structure to immediately and rapidly exhaust the air therefrom and which is adapted upon exhaustion of said air to close, due to the tendency toward a partial vacuum condition within the cushion structure which renders atmospheric air effective to close such device.

A further object is to provide a cushion structure having a substantially air-tight cover throughout which is provided with means for permitting of immediate and rapid egress of air upon depression, such means being also adapted to prevent ingress of air therethrough following depression, in which case the only air admitted is that which is admitted through the substantially air-tight covering whereby, upon depression of the cushion structure, its normal recoil or rebound action is prevented and the cushion structure is restored to normal condition slowly and without effect upon the user.

A still further object is to provide means including very light weight and flexible and automatically operable exhaust and closure means rendered effective by slight pressure to either positively permit immediate and quick exhaust of air from the interior of the cushion structure or to prevent admission of the air therethrough to the cushion structure in any and all positions of the same.

An additional object is to provide a self-contained means for accomplishing the foregoing features and advantages and which is very simple in construction, cheap to manufacture, readily assembled and readily attachable and detachable.

Other and further objects and advantages will become apparent as this description progresses and by reference to the drawings wherein,—

Figure 1 is a front elevation of a cushion structure embodying our invention.

Figure 2 is a transverse vertical sectional view taken on line 2—2 of Fig. 1.

Figure 3 is an enlarged front elevated view of cushion check means shown in Fig. 1.

Figure 4 is an elevated view of the cushion check means taken at a position the reverse of that of Fig. 3, namely, a rear elevated view.

Figure 5 is an enlarged vertical sectional view taken on line 5—5 of Fig. 3.

Figure 6 is a detail view showing the valve retaining member which we preferably employ in connection with the construction shown in Figures 3 and 4.

Figure 7 is a detail view of the floating disk-like valve which we may employ in connection with our invention and which is shown in section in Figure 5.

Figure 8 is a slightly reduced (as compared to Fig. 7) detail view showing a modified form of floating valve construction.

Referring particularly to the drawings the cushion structure which we may employ comprises top and bottom supports 1 and 2 with a plurality of coil springs 3 mounted therebetween in accordance with the usual practice. The top support 1 is covered with a suitable padding material 4, the entire structure being covered by a suitable cloth material 5 which is substantially air-tight, but which is of sufficient porosity to slowly admit air to the interior of the cushion structure.

In the ordinary cushion structure, such as that used in connection with automobiles, the covering 5 does not ordinarily cover the entire structure but covers only the top, side and end portions, the bottom being left open.

In such structures which employ internal spring means or coil springs such as the springs 3, when the cushion structure is depressed in the case of shocks, jolts or impacts being transmitted thereto, the spring means or springs are compressed and placed under considerable pressure which, unless otherwise taken care of, will produce a quick and snappy rebound or return action of the springs at the end of the impact or shock tending to throw the person or object which may be upon the cushioning structure.

It is the principal object of our invention to prevent this action and, upon compression of the spring supporting structure, to cause the same to return to its normal position at a slow and uniform rate such as will not throw and add to the discomfort of the user. To accomplish this we, preferably, extend the covering 5 to cover the entire cushion structure. To provide the checking or snubbing effect we employ a plurality of air check devices such as shown in Fig. 5, a plurality of these devices being mounted in the covering 5 at the sides and ends of the cushion structure as shown in Figs. 1 and 2. While the drawings show four of these devices at each side and two at each end, it is to be understood that we are not limited to such number as any desired number may be employed to meet the particular conditions of use without departing from our invention.

This structure (Fig. 5) may comprise a valve seat member 6 having a valve seating portion 6ª upon which the valve 8 is adapted to seat under conditions to be explained. The valve seat member 6 is of a cup-shaped construction having an opening 6ᵇ in its bottom and adapted to snugly receive the cup-shaped portion of the valve-retaining member 7. Each of these members 6 and 7 is provided with annular horizontal flange portions 6ᶜ and 7ª, respectively, adapted to abut each other in the manner shown in Fig. 5. The flange of the valve-retaining member 7 extends out beyond the flange of the member 6 for a purpose to be described. The valve-retaining member is also provided with an opening 7ᵇ, the bottom of such member being provided with triangularly shaped and inwardly extending horizontal projections 7ᶜ giving the opening 7ᵇ the shape shown in Fig. 6. The bottoms of the members 6 and 7 are spaced apart to provide a valve chamber adapted to receive the floating disk-like valve 8. This valve is very light in construction and takes generally a circular form of such size as to readily cover the opening 6ᵇ in the member 6. The radial extensions of the opening 7ᵇ of the member 7 provide the opening 7ᵇ of greater width than the opening 6ᵇ and sufficiently wide that the valve 8 will never close the same. The triangular extensions 7ᶜ of the member 7 prevent the valve 8 from being removed from the valve chamber except upon disassembly of the member 7. The valve 8 is floatingly arranged in the valve chamber and is provided with peripheral projections 8ª which closely approach the sides of the member 6 and which are adapted to guide the valve 8 in its reciprocatory floating movement toward and from the seat 6ª to prevent wedging or sticking of the same in an angled position whereby it might fail to properly cover the seat 6ª and opening 6ᵇ.

An attaching member 9 is provided which has a cylindrical body portion adapted to pass over and surround the cup-like portion of the member 6 and it is also provided with a horizontal flange portion 9ª adapted to abut the flange 6ª of the member 6. The arrangement of the foregoing described parts is such that the construction described comprises a self-contained unit, wherein the horizontal flange portions of the members 6, 7 and 9 are arranged in abutting relation, the outer portion of the flange 7ª being turned over and crimped upon the outer portions of the flanges 9ª and 6ᶜ thereby securing and holding all of these parts together as a single unit.

In order to attach our invention to the cushion construction suitable openings of a size approximating the diameter of the cylindrical body portion of the member 9 are punched, or otherwise formed, in the cover 5 and the assembled structure is passed therethrough, as shown in Fig. 5. Following this operation a washer member 10 is passed downwardly over the cylindrical body portion of the member 9 against the covering 5 and the projecting or outer end portion 9ᵇ of the member 9 is bent and crimped outwardly over such washer 10 thereby clamping and holding the same in place and, in turn, securely fastening the construction as a whole to the covering 5. In making the foregoing installation, the construction is so mounted in the covering 5 that the member 7 projects outwardly.

In operation, with the substantially airtight covering 5, it is obvious that upon depression of the cushion structure and compression of the springs 3, exhausting of the air within the cushion structure takes place through the air check devices. This action takes place as follows: As the cushion structure is depressed there is a tendency to force the air from the interior thereof, and this forcing action, even if of a slight nature (due to light and floating construction of the valve 8) moves the valve 8 away from the valve seat 6ª against the triangular projections 7ᶜ of the member 7. As this action takes place, due to the fact that the diameter of the valve 8 is less than the diameter of the opening 7ᵇ, the air within the cushion structure is permitted to rapidly pass through the opening 6ᵇ past the valve 8 and through the opening 7ᵇ to atmosphere in a substantially unrestricted manner. There being a plurality of these structures employed, the air within the cushion structure is very rapidly exhausted and without any tendency to hinder the ordinary shock absorbing and cushioning action of the springs 3. As soon as the force of the jolt, shock or impact is spent and compression of the springs 3 ceases, and when there is a tendency for the springs to rapidly return to their normal position and cause a quick and snappy rebound action, the valve 8 is moved upon the seat 6ª preventing ingress of air through the same to the interior of the cushion construction. As soon as the depressing action stops, the springs 3 tend to restore the cushion structure to its normal position and there is a tendency for atmospheric air to pass through the air check means to the interior of the cushion structure to restore the interior thereof to normal air pressure. However, the differential pressure condition established immediately forces the valve 8 to and upon the valve seat 6ª and holds the same there, thereby preventing immediate admission of atmospheric air to the interior of the construction. With this condition existing in addition to the force of the atmospheric air acting upon and throughout the surface of the cushion structure, the springs 3 are held compressed and cannot immediately return the cushion structure to its normal undepressed condition, whereby the usual rebound or recoil and throwing action does not take place. In view of the fact that the only air that can now be admitted to the interior of the cushion structure is through the substantially air-tight covering 5, it is obvious that the interior of the construction is very slowly and gradually restored to its normal air condition, the springs aiding in this as air is thus slowly admitted to the interior of the cushion structure. The interior of the cushion will finally be restored to normal air pressure, the springs 3 resuming their normal position, and the cushion structure is supported in its normal seating position.

It is obvious that in some instances where our invention may be employed, an absolutely air-tight covering 5 may be employed. In that event it becomes necessary to provide for the slow ingress of air to the interior of the covering 5 in a manner other than directly through the covering. In this latter event we may construct the valve 8 in the manner similar to the valve 8ˣ in Fig. 8. This valve is similar in all respects to the valve 8 of Fig. 7 except that it is provided with a centrally disposed opening 11. With this construction when an absolutely air-tight covering 5 is employed, upon the movement of the valve 8ˣ to the seat 6ª, the inflow of air to the interior of the cushion construction will take place through the opening 11 in each of the valves 8ˣ. The size of the opening 11 in these valves may be varied to any desired extent so that the rate of inflow of air and the rate of return of the cushion construction to its normal position may be varied to suit the particular conditions of use.

The opening 11 should at all times be of such size that the rapid recoil or rebound action of the springs 3 is eliminated in a manner already described in connection with the preferred form.

From the foregoing it is obvious that our invention provides an exceedingly simple cushion check or snubbing means which is cheap to manufacture, readily assembled and readily attachable and detachable. It positively eliminates objectionable rebound action of the cushion structures, permitting such structures to absorb shocks, jolts and impacts in the ordinary manner and prevents discomfort due to rebound action. In the application of our invention to automobile cushion constructions the comfort of the passenger or passengers of the automobile is increased to the maximum point.

While we have shown only two forms of our invention, it is obvious that various changes and modifications may be made or resorted to without departing from the spirit and scope of our invention as defined by the claims which follow.

We claim:

1. In a device of the character described, a valve seat member having an opening and a flange, a valve retainer having an opening and a flange and cooperating with said valve seat member to form a valve chamber, a valve in said chamber, and an attaching member having a flange, the edge of one of said flanges being bent over the edges of said other flanges to hold all of said parts together in a self-contained unit.

2. In a device of the character described, a cup-shaped member having an opening in its bottom, another cup-shaped member having a larger opening in its bottom and cooperating with and spaced from said first member to form a valve chamber therebetween, an annular disk-like valve in said chamber adapted to close the opening of said first member, said valve having peripheral projections approaching the walls of said first member to guide said valve in its movement to and from its seated position, an attachment member encircling said first member, said second member being interlocked with portions of said other members to hold all of said parts together as a unit.

3. In an apparatus of the class described, a valve device adapted to be attached to a covering material comprising a cylindrical member having a bottom with an opening therein, a second cylindrical member having a bottom with a larger opening, the bottoms of said members being spaced to form a valve chamber, a valve in said chamber of such size as to cover the opening in said first member but not in said second member, an attachment member carried upon said first member, and adapted to contact with one side of said material, a washer member surrounding said attachment member and adapted to contact with the other side of said material, a portion of said attachment member being bent over and upon said washer member to secure the member as a whole to said material.

4. In an apparatus of the class described, a cup-shaped member having an opening in its bottom and a flange, another cup-shaped member having a larger opening in its bottom and a wider flange, an open-ended attachment member surrounding said first member and having a flange narrower than the flange of said second member, said second member flange being bent over upon said other flanges to hold said parts together, a valve disposed between said first and second members and of such size as to close the opening of said first member but not that of said second member, a washer member surrounding said attachment member and held in place by a portion of said attachment member.

In witness whereof, we have subscribed our names.

CARL L. KNUTSON.
WILLIAM G. ROBY.
ARTHUR W. KIMBELL.